United States Patent
Müller-Peddinghaus

(10) Patent No.: US 6,394,693 B1
(45) Date of Patent: May 28, 2002

(54) FIXING CLAMP

(76) Inventor: Reiner Müller-Peddinghaus, Klutstein 22a, Bergisch Gladbach (DE), D-51467

( * ) Notice: Subject to any disclaimer, the term of this patent is extended or adjusted under 35 U.S.C. 154(b) by 0 days.

(21) Appl. No.: 09/526,517

(22) Filed: Mar. 16, 2000

(30) Foreign Application Priority Data

Mar. 16, 1999 (DE) ..................... 299 04 763 U

(51) Int. Cl.$^7$ .................................. B25G 3/00
(52) U.S. Cl. .................. 403/374.3; 403/373; 403/362; 24/71.1; 24/135 N
(58) Field of Search ............................ 24/135 N, 71.1; 403/373, 374.1, 374.2, 374.3, 374.4, 362

(56) References Cited

U.S. PATENT DOCUMENTS

| | | | |
|---|---|---|---|
| 1,562,053 A | * | 11/1925 | Ratigan |
| 2,045,847 A | * | 6/1936 | Fotsch |
| 2,205,322 A | * | 6/1940 | Thomas et al. |
| 2,287,762 A | * | 6/1942 | Rogoff |
| 2,551,636 A | * | 5/1951 | Ratigan |
| 2,624,370 A | * | 1/1953 | Flamand |
| 2,809,363 A | * | 10/1957 | Schertel et al. |
| 3,072,881 A | * | 1/1963 | Norris |
| 3,339,174 A | * | 8/1967 | Walter et al. |
| 3,416,763 A | * | 12/1968 | Moreno |
| 3,638,912 A | * | 2/1972 | Moreno |
| 4,936,843 A | * | 6/1990 | Sohngen |
| 4,969,616 A | * | 11/1990 | Apperson et al. |
| 5,021,054 A | * | 6/1991 | Monfardini et al. |
| 5,496,319 A | * | 3/1996 | Allard et al. |
| 5,588,773 A | * | 12/1996 | Friedrichs et al. |

FOREIGN PATENT DOCUMENTS

| | | |
|---|---|---|
| DE | 2750496 | 11/1977 |
| DE | 3213383 | 10/1982 |
| EP | 0950831 | 3/1999 |

* cited by examiner

*Primary Examiner*—Lynne H. Browne
*Assistant Examiner*—Tomlyne A Malcolm
(74) *Attorney, Agent, or Firm*—Diller, Ramik & Wight

(57) ABSTRACT

A fixing clamp for a tensioning rope is proposed, where a clamping screw presses the tensioning rope against an abutment surface in friction-tight fashion. The abutment surface is formed by the bottom of metal bracket (10) bent in an approximately V or U shape and located in the mount (8) of a plastic housing. The clamping screw (14) reaches through the wall of the housing (1) and a nut (13) fixed in non-rotating fashion by the upper, bent ends (11, 12) of the legs of the metal bracket (10).

14 Claims, 1 Drawing Sheet

FIXING CLAMP

BACKGROUND OF THE INVENTION

The invention relates to a fixing clamp for an elongated tensioning element, such as a tensioning rope or a tensioning wire, which can be slid or adjusted relative to a mount in order to generate a tensile force, preferably in the longitudinal direction of the tensioning element, where the clamp comprises a clamping screw, the end of which presses the tensioning element against an abutment surface in friction-tight fashion.

In order to be able to absorb high tensile forces of the tensioning element, clamps of this kind are manufactured as turned parts made of metal. For example, a known fixing clamp consists of a solid clamping plate with a drilled hole in the middle. The drilled hole is followed by a hollow spindle provided with a male thread, through which the tensioning element can be guided into the clamping plate. A thread is cut into the clamping plate perpendicular to the hollow spindle, by means of which the clamping screw can be turned against the tensioning element. Given a sufficiently high screw pressure, the tensioning element is pressed against the circumferential wall of the drilled hole in friction-tight fashion, the drilled hole thus forming an abutment surface.

SUMMARY OF THE INVENTION

The hollow spindle, possibly in conjunction with matching locknuts, is used for adjustable fastening of the clamp in a mount.

Owing to their being manufactured as turned parts, clamps of this kind are relatively expensive.

The object of the invention is to create a generic fixing clamp which involves comparatively low manufacturing costs and can absorb high tensile forces.

According to the invention, the object is solved in that the abutment surface is formed by the bottom of a metal bracket bent in an approximately V or U shape and located in a mount in a plastic housing, where the clamping screw reaches through the housing wall and a nut fixed in non-rotating fashion by the upper, bent ends of the bracket legs.

Consequently, the clamp according to the invention consists entirely of parts which can be manufactured easily and inexpensively or are marketed as mass-produced articles.

The plastic housing provided with a hollow spindle, as in the prior art, can be manufactured in one piece as an injection moulding and thus inexpensively. The plastic housing, which is open on one side, displays a mount into which a bent metal bracket can be inserted. The bent ends of this bracket surround a nut, which is fixed in non-rotating fashion in this way. The clamping screw reaches through a drilled hole in the housing wall of the plastic housing and the corresponding nut and, in this way, can press the tensioning element guided through the hollow spindle against the base of the bracket.

As the bracket, the clamping screw and the nut are commercially available as inexpensive, mass-produced articles, the clamp as a whole can be manufactured more than 50% more cheaply than a conventional fixing clamp, while being designed for comparable tensile forces.

The clamp is fastened to a mount as in the prior art in that the hollow spindle is guided by a drilled hole in the mount, where it is fixed or locked by one or two conventional nuts.

In the fixing clamp according to the invention, the plastic housing with the hollow spindle can easily absorb the customary tensile forces, while the clamping forces acting perpendicular thereto are absorbed by the metal parts used. A glass fibre-reinforced plastic can be used as the plastic in order to further increase the load-bearing capacity of the clamp.

The mount inside the plastic housing is designed in such a way that it surrounds the metal bracket in form-fitting fashion and fixes it in its inserted position. In this context, the mount can be supported against the housing wall by means of one of more webs. For reasons of corrosion protection, the metal parts of the clamp preferably consist of special steel or aluminium.

An example of the invention is illustrated in the drawings and described in detail below on the basis of the drawings. The drawings show the following:

DESCRIPTION OF THE PREFERRED EMBODIMENTS

Figure 1:
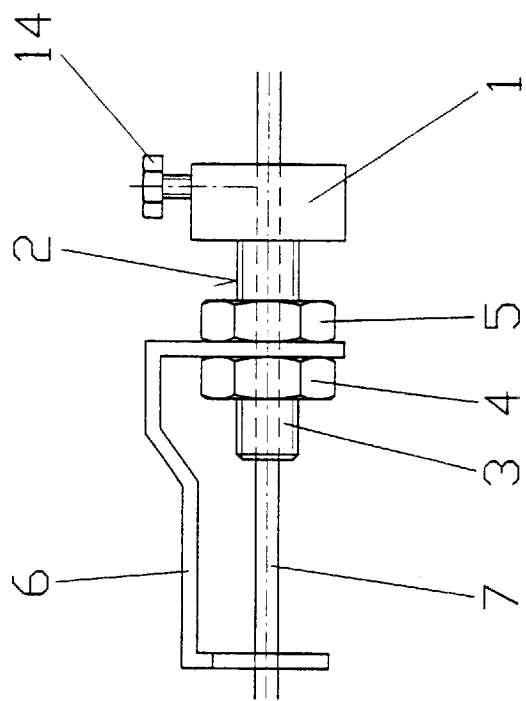
FIG. 1: A side view of the clamp fastened to a mount.
Figure 3:
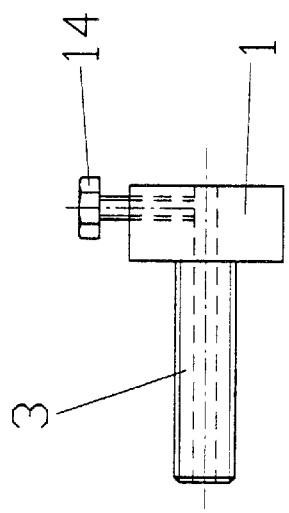
FIG. 3: A longitudinal section through the clamp.
Figure 2:
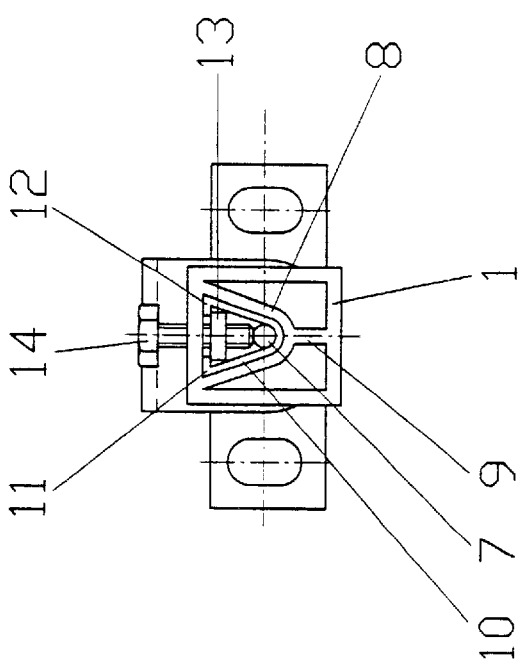
FIG. 2: A top view of the clamp in the longitudinal direction of the tensioning element.

The clamp illustrated in the drawings consists of a rectangular plastic housing 1, on which a hollow spindle 3 provided with a male thread 2 is integrally moulded in one piece.

The clamp can be fastened to a mount 6, designed as a metal bracket, with the aid of hollow spindle 3 and two fastening nuts 4, 5.

Mount 8 serves to accommodate a likewise V-shaped metal bracket 10, ends 11, 12 of which are bent over and fix a nut 13 in non-rotating fashion.

Inside plastic housing 1, an approximately V-shaped mount 8 is provided, which is supported against the wall of plastic housing 1 by means of a web 9.

Mount 8 serves to accommodate a likewise V-shaped metal bracket 10, ends 11, 12 of which are bent over and fix a nut 13 in non-rotating fashion.

A clamping screw 14 reaches through the upper wall of plastic housing 1 and nut 13. In the screwed-in position, it presses against tensioning rope 7 in such a way that the latter is in friction-tight contact with the bottom of V-shaped metal bracket 10 and thus fixed in place in the longitudinal direction.

The relative movement of the clamp, which is possible in the longitudinal direction of tensioning rope 7, allows the tensile force acting on tensioning rope 7 to be varied.

Although a preferred embodiment of the invention has been specifically illustrated and described herein, it is to be understood that minor variations may be made in the apparatus without departing from the spirit and scope of the invention, as defined the appended claims.

I claim:

1. A fixing clamp for an elongated tensioning element comprising a clamping screw (14), a bracket (10) of one of a substantially V and U shape having upper opposing ends (11, 12), the bracket (10) being located in a mount (8) in a housing (1), the clamping screw (14) passing through the housing (1), a nut (13) fixed in non-rotating fashion by the upper opposing ends (11, 12) of the bracket (10), and said screw (14) being threaded through said nut (13).

2. The fixing clamp as defined in claim 1 wherein the housing (1) includes a hollow, integrally moulded, one piece spindle (3) for detachable fastening of the bracket (10) to a mount (6), and a tensioning element (7) passing through said hollow spindle (3).

3. The fixing clamp as defined in claim 2 wherein at least one of the housing (1) and the hollow spindle (3) are made of glass fibre-reinforced plastic.

4. The fixing clamp as defined in claim 1 wherein the housing (1) is an injection moulding.

5. The fixing clamp as defined in claim 1 wherein the mount (8) is supported against a housing wall of the housing (1) by means of at least one web (9).

6. The fixing clamp as defined in claim 2 wherein the housing (1) is open on a side facing away from the hollow spindle (3).

7. The fixing clamp as defined in claim 1 wherein at least one of the bracket (10), the nut (13) and the clamping screw (14) are made of steel.

8. The fixing clamp as defined in claim 1 wherein at least one of the bracket (10), the nut (13) and the clamping screw (14) are made of aluminum.

9. The fixing clamp as defined in claim 1 wherein said bracket (10) is made of metal and said upper ends (11, 12) are bent into the opposing relationship thereof.

10. The fixing clamp as defined in claim 1 wherein the housing is made of plastic.

11. The fixing clamp as defined in claim 9 wherein the housing is made of plastic.

12. The fixing clamp as defined in claim 1 wherein said bracket (10) includes a bracket wall which extends between each upper opposing end (11, 12) and merges with a bight wall, and said screw (14) has a terminal end in opposing relationship to said bight wall.

13. The fixing clamp as defined in claim 2 includes a mount (6) which has at least one leg telescopically received upon said spindle (3), a tensioning element (7) which passes through said spindle (3), and said screw (14) secures said tensioning element (7) against said bracket (10).

14. The fixing clamp as defined in claim 2 includes a mount (6) which has at least one leg telescopically received upon said spindle (3), a tensioning element (7) which passes through said spindle (3), said screw (14) secures said tensioning element (7) against said bracket (10), said spindle (3) is threaded, and fastening means (4, 5) telescopically threaded on said spindle (3) for detachably fastening the mount (6) to the bracket (10).

\* \* \* \* \*